United States Patent Office 3,091,636
Patented May 28, 1963

3,091,636
PROCESS FOR THE PRODUCTION OF
TEREPHTHALIC ACID
Richard William Harold Benson, Harrogate, England, assignor to Imperial Chemical Industries Limited, London, England, a corporation of Great Britain
No Drawing. Filed May 7, 1959, Ser. No. 811,548
Claims priority, application Great Britain Dec. 10, 1958
1 Claim. (Cl. 260—524)

This invention relates to an oxidation process, more particularly to the oxidation of aliphatic substituted aromatic compounds such as para-xylene.

The oxidation of aliphatic substituted aromatic compounds to the corresponding carboxy aromatic compounds by means of oxygen or an oxygen containing gas in the presence of a metallic catalyst is well-known. Such a technique, as applied to the oxidation of para-diisopropyl benzene using a manganese/cobalt or manganese/barium catalyst, is described in United States Patent 2,746,990. Oxidative reactions, analogous to those with para-diisopropylbenzene, are possible when other substituted aromatic compounds such as para-xylene are used as starting materials. It has been found to be generally advantageous to carry out these oxidations in the presence of bromine or a bromine containing substance in addition to the metallic catalyst and this technique is the subject of United States Patent 2,833,816.

The preparation of phthalic acids from substituted benzenes by bromine assisted oxidation is a process which has assumed considerable commercial importance since these acids, particularly terephthalic acid, are valuable intermediates in the manufacture of high polymers, for example polyethylene terephthalate. The determination of reaction conditions for optimum yield and quality of product has therefore been the target of detailed process development research. In respect of terephthalic acid attention has been focussed on the problem of quality since its conversion to polyesters on manufacturing scale has hitherto been carried out by a circuitous route, involving first the formation of a dialkyl terephthalate, the choice of this route being dictated by the difficulty of raising the intractable terephthalic acid to the very high standard of purity required to allow direct reaction with diols. An oxidation process yielding a "crude" terephthalic acid of improved quality clearly offers a better chance of overcoming the problem of purification which would, in turn, make operation of a direct route from acid to polymer a practical proposition.

According to the present invention I provide a process for the production of terephthalic acid of improved quality in high yield by interaction in the liquid phase of an aliphatic para disubstituted benzene and molecular oxygen in the presence of bromine and a heavy metal oxidation catalyst, an excess of oxygen being continuously maintained in the reaction system, characterised in that there is present at least one of the metals listed below in the amount specified:

(a) A copper content between 25 and 150 parts per million.

(b) A zinc content between 500 and 5,000 parts per million.

(c) A tin content between 100 and 1,000 parts per million.

The preferred heavy metal oxidation catalyst is a combination of cobalt and manganese, the reaction being generally carried out in inert media such as monocarboxylic acids, for example acetic acid, or water.

The mechanism of oxidation, illustrated by a methyl substituent, is as follows:

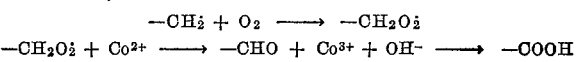

Possible side reactions leading to poor quality and loss of yield are:

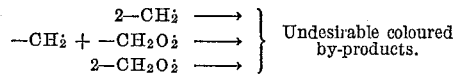

Analogous reactions take place with other starting materials.

It has been found that the side reactions are encouraged when the reaction mass is deficient in oxygen, that is to say when the amount of oxygen present is inadequate to match the chemical rate of reaction which is dependent on the progress of two main stages, for example:

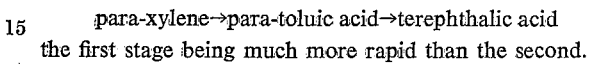

the first stage being much more rapid than the second.

Maintenance of excess oxygen in the system throughout the entire period of reaction may be carried out by control of oxygen input and pressure in the system. It is, however, most desirable for efficient plant utilisation to operate the process as far as possible at maximum oxygen input and in these circumstances maintenance of excess oxygen is best achieved by adjustment of the chemical rate by variation of temperature, concentration of catalyst, hydrocarbon and solvent or by the incorporation of a general oxidation inhibitor in appropriate amount.

The amount of oxygen present may be conveniently measured by determination of the content of the off-gases. Levels below 1% by volume are not easily determined and when the content rises above 2% excessive quantities are passing to waste and the compressor duty is uneconomically increased. I therefore prefer to operate between these limits (1–2% by volume) of excess oxygen as far as possible.

Copper, zinc and tin are oxidation inhibitors which we have found very satisfactory in the controlled depression of oxidation rate. There metals may be introduced into the reaction in the form of any convenient compound to give the desired concentration. Suitable compounds include salts of copper, zinc and tin such as the acetates, sulphates, carbonates and halides. When the bromides are used in this way they may also serve as a source of the bromine required to assist the oxidation reaction.

In considering the controlled addition of these specified metals the material of construction of the reaction vessels must also be taken into account. The very acidic nature of the reaction components leads to appreciable corrosion, and the increase in the metal content of the system from this source must be carefully controlled. This may be done by adding basic substances or by adjusting the metal/bromine ratio as described respectively in United States applications Nos. 799,435 and 799,457. Alternatively the oxidation process may be operated in a glass or titanium lined reactor.

While I have found that for practical purposes the amounts of copper, zinc and tin should be within the ranges hereinbefore stated the effect of these metals on this oxidative process becomes perceptible with very low concentrations. The effect is, moreover, dependent on the temperature at which the oxidation takes place and with increase in reaction temperature the amount of additive metal required becomes less. In the oxidations with which we are concerned here, however, it is the temperature range from about 180° C. to 230° C. which is most important. At higher temperatures destructive oxidation leading to products such as carbon dioxide become more prominent while below 180° C. the terephthalic acid produced contains a greater proportion of partially oxidised intermediates such as para-toluic acid and aldehydobenzoic acid. In oxidising para-xylene I prefer to operate within the temperature range 215–

220° C. in the presence of about 100 parts per million copper or 1,500 parts per million zinc.

The example which follows is provided to illustrate my invention.

Example

The oxidations were carried out in a titanium reactor 2″ in diameter and 3′ long through which air at the required pressure could be passed.

The standard charge for an oxidation was

| | Parts |
|---|---|
| Glacial acetic acid | 1060 |
| Para-xylene | 424 |
| Cobalt bromide | 2 |
| Manganese acetate | 2 |

Copper sulphate $5H_2O$, zinc acetate $2H_2O$ and stannous chloride $2H_2O$ were added to give the concentrations of copper, zinc and tin shown in the following table. The amounts of these metals are expressed as parts per million in the reaction mixture.

| Additive metal | Terephthalic acid colour | |
|---|---|---|
| | Oxidation at 215–220° C. | Oxidation at 228–230° C. |
| Nil | 0.66 | 1.68 |
| Copper 33 | 0.23 | 0.21 |
| Copper 66 | | 0.06 |
| Copper 82 | 0.13 | |
| Tin 170 | 0.20 | |
| Zinc 400 | 0.49 | |
| Zinc 800 | 0.19 | |
| Zinc 1600 | 0.10 | |
| (a) Zinc 1400 | 0.09 | |
| (b) Zinc 1400 | 0.06 | |

In experiment (b) an excess of oxygen was maintained in the off-gases throughout the reaction. In experiment (a) the system ran short of oxygen for some time.

In these experiments the colour of terephthalic acid quoted is the optical density of a 4% (wt.) solution is aqueous ammonia measured using a 4 cm. cell with light wavelength $380\mu$.

Samples of terephthalic acid prepared according to our improved oxidation process have been found particularly amenable to purification, for example by crystallisation from water or a monocarboxylic acid such as acetic or benzoic acid, to a level of purity which enables their conversion to polyesters of high quality by direct reaction with diols such as ethylene glycol.

What I claim is:

A process for the production of terephthalic acid from para-xylene by oxidizing para-xylene in the liquid phase in acetic acid at a temperature in the range of 180–230° C. in the presence of bromine and a heavy metal catalyst selected from the group consisting of cobalt and manganese in further combination while maintaining an excess of oxygen in the reaction system with an oxygen content in the off-gases between 1% and 2% by volume and maintaining in the reaction system an oxidation inhibitor selected from the group consisting of copper and zinc, provided that when said inhibitor is copper it is present at a concentration of about 100 parts per million of the reaction mixture and when said inhibitor is zinc it is present at a concentration of about 1600 parts per million of the reaction mixture.

References Cited in the file of this patent

UNITED STATES PATENTS

| | | |
|---|---|---|
| 2,673,217 | Hull | Mar. 23, 1954 |
| 2,833,816 | Saffer et al. | May 6, 1958 |
| 2,907,792 | McIntyre | Oct. 6, 1959 |
| 2,959,613 | Whitfield | Nov. 8, 1960 |
| 2,962,361 | Spiller et al. | Nov. 29, 1960 |